United States Patent
Fehr et al.

(10) Patent No.: US 11,513,427 B2
(45) Date of Patent: Nov. 29, 2022

(54) METHODS AND APPARATUS TO MOUNT A CAMERA TO A MOUNTING DEVICE

(71) Applicant: CKnapp Sales, Inc., Goodfield, IL (US)

(72) Inventors: Micah Fehr, Danvers, IL (US); Nicholas Welander, East Peoria, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 0 days.

(21) Appl. No.: 17/176,916

(22) Filed: Feb. 16, 2021

(65) Prior Publication Data

US 2022/0260895 A1  Aug. 18, 2022

(51) Int. Cl.
*G03B 17/56* (2021.01)
*F16M 13/02* (2006.01)
*F16M 11/12* (2006.01)

(52) U.S. Cl.
CPC ........... *G03B 17/561* (2013.01); *F16M 11/12* (2013.01); *F16M 13/02* (2013.01)

(58) Field of Classification Search
CPC .................................................. G03B 15/561
See application file for complete search history.

(56) References Cited

U.S. PATENT DOCUMENTS

| | | | |
|---|---|---|---|
| 7,673,838 B2 * | 3/2010 | Oddsen, Jr. | ........ F16M 11/2064 248/225.11 |
| 9,057,934 B2 | 6/2015 | Lellky et al. | |
| 9,163,779 B2 | 10/2015 | Funk et al. | |
| 9,372,383 B2 * | 6/2016 | Johnson, Sr. | ........ F16M 11/041 |
| 9,549,609 B2 * | 1/2017 | Constantino | ............ H04N 5/28 |
| 9,891,504 B2 | 2/2018 | Fromm | |
| 10,218,965 B2 * | 2/2019 | Irschick | ............... H04N 13/282 |
| 2006/0027718 A1 | 2/2006 | Quijano et al. | |
| 2012/0025046 A1 | 2/2012 | Yen | |
| 2017/0055697 A1 | 3/2017 | Kincaid et al. | |
| 2020/0245730 A1 * | 8/2020 | Grinnell | ................. F16M 13/04 |

FOREIGN PATENT DOCUMENTS

| | | |
|---|---|---|
| EP | 2686750 | 10/2018 |
| JP | 2004109776 | 4/2004 |
| WO | 2012123574 | 9/2012 |

OTHER PUBLICATIONS

Lensvid, "Off The Shelf Overhead Camera Rig DIY Build", https://lensvid.com/gear/lensvid-exclusive-off-the-shelf-overhead-camera-rig-diy-build/ dated Jan. 12, 2016, which incorporates https://www.youtube.com/watch?v=XudPSYmmmrk) (Year: 2016).*

(Continued)

*Primary Examiner* — Leon W Rhodes, Jr.
(74) *Attorney, Agent, or Firm* — Hanley, Flight & Zimmerman, LLC

(57) ABSTRACT

Methods, apparatus, systems and articles of manufacture are disclosed to mount a camera to a mounting plate, the apparatus comprising: a camera socket connector to connect to a socket of the camera; and a mounting plate connector to connect to the mounting plate, wherein the camera socket connector able to be removably coupled to the mounting plate connector.

20 Claims, 21 Drawing Sheets

(56) References Cited

OTHER PUBLICATIONS

9.Solutions VESA to ⅝" Receptacle Product Manual, https://9.solutions/wp-content/uploads/2016/03/vesa_backside.pdf (Year: 2016).*

Dang, https://www.youtube.com/watch?v=IzW1e8JQ0zl annotated screenshots (Year: 2017).*

B&H Photo listing for Arca-Swiss Quick Release Plate at https://www.bhphotovideo.com/c/product/2125-REG/Arca_Swiss_802221_Camera_Plate_for_Hasselblad.html Archive.org copy dated Apr. 14, 2012 (Year: 2012).*

Petaapixel, "How to modify a monitor arm into an overhead camera mount", https://petapixel.com/2021/02/08/how-to-modify-a-monitor-arm-into-an-overhead-camera-mount/ (Year: 2021).*

Overhead Camera Rig for $60 Using a Monitor Cam, https://www.youtube.com/watch?v=IzW1e8JQ0zl&t=4s, Feb. 4, 2017, 1 page.

\* cited by examiner

METHODS AND APPARATUS TO MOUNT A CAMERA TO A MOUNTING DEVICE

FIELD OF THE DISCLOSURE

This disclosure relates generally to camera mounting, and, more particularly, to methods and apparatus to mount a camera to a mounting plate.

BACKGROUND

In recent years, cameras have been used to capture still or moving pictures, based on user inputs. Additionally, in recent years, the Video Electronic Standards Association (VESA™) has standardized numerous aspects of video such as transmission (DisplayPort) or even the sizing of monitor mounts in order to hold Flat Screen televisions (TVs). These mounts are helpful for supporting the weight of a monitor, display, etc.

Figure 1A:
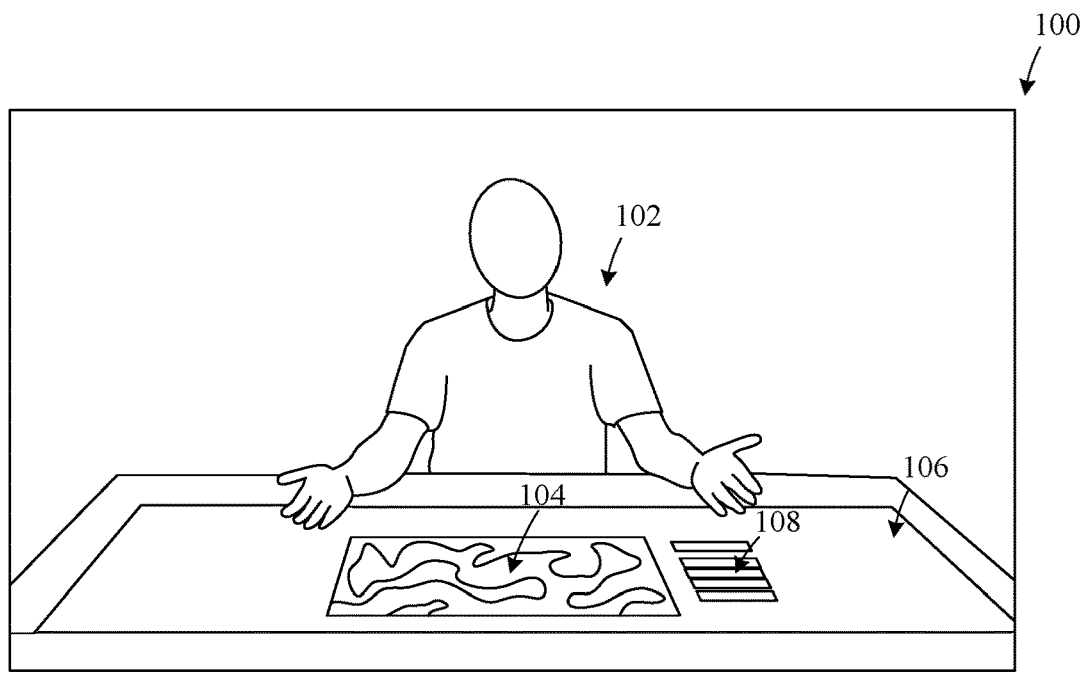
FIG. 1A is an example image captured using a forward facing camera.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

The popularity of internet video providers such as YOU-TUBE™ has led to an increase of video bloggers (e.g., vloggers) who have begun making original content with video cameras. Content can include, for example, playing a board game, interviewing a friend, or even cooking a meal. Different types of content require different shots. In an example interview, the video-camera is typically facing the interviewer and the interviewee capturing the faces. The video-camera is typically attached to a tripod with the video-camera's tripod socket. FIG. 1A illustrates an image 100 captured by a front facing camera. In the example of FIG. 1A, the human 102 is facing the camera (not shown) and the example board game 104 is on the example table 106. The example board game pieces 108 cannot be seen clearly in this front facing shot.

For content such as playing a board game, while the video-camera could be facing the interviewer and interviewee, the video-camera in this position is not strategically positioned to capture the game pieces on the map.

Figure 1B:
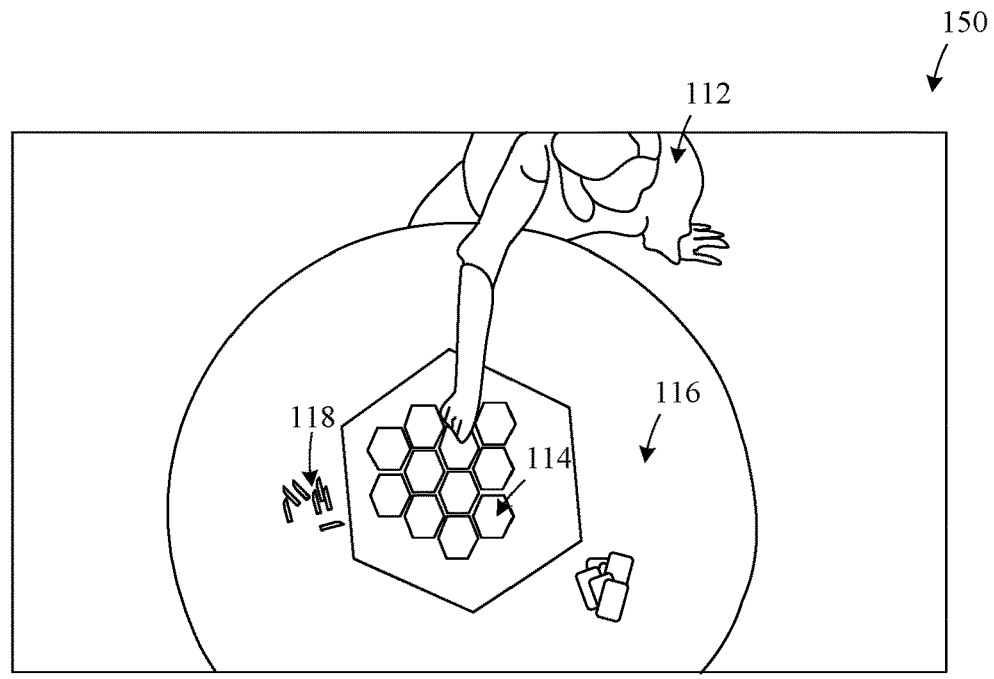
FIG. 1B is an example image captured using an overhead camera.

FIG. 1B is a top-down image 150 which allows the board game to be captured, so a viewer watching the video can feel a part of the action. The example human 112 is playing an example game 114 on an example table 116. The positions of the example game pieces 118 are easily seen due to the top-down shot. Other examples include top-down shots of ingredients in a cooking vlog, or sketches created in real time. There are some prior art implementations used to obtain the top-down shot, but each such implementations suffer from problems. For example, tripods may not be useful for top-down shots because the tripod is normally about 6 feet tall, and a top-down overhead shot needs to be taller than the subject of the video and pointing down. Prior art solutions of mounting a camera for a top-down shot include friends standing on ladders, holding the camera, drones, C-stand rigs. However, a friend standing on a ladder holding a camera results in shaky video captures. An indoor drone may be loud, interfering with audio capture. A C-stand rig is expensive, and, if the video-camera battery dies, it can be difficult to detach the video-camera from the C-stand rig.

The Video Electronic Standards Association or VESA™ is an organization that seeks to standardize specifications related to display and display interface for computers and other consumer electronics. VESA™ has standardized the television/laptop monitor industry with FDMI or Flat Display Monitor Interface (FDMI), also called a VESA™ Mounting Interface Standard (MIS) or colloquially as VESA™ Mount. Flat panel monitors are attached to walls. Larger television (e.g., TV) monitors are more likely to be heavier, and heavier TV monitors require more support than lighter TV monitors to stay firmly attached to the wall. VESA™ created a pattern for mounting TVs with different weights and sizes. VESA™ developed (e.g., instituted, decided on) seven different mounting patterns to accommodate a broad range of differently sized and weighted TV monitors. The VESA™ patterns are typically rectangular quadrilateral (e.g., square) of screw holes at a specified distance apart. VESA™ standardization is a benefit for TV manufacturers, mounting manufactures, and consumers as different TVs are able to attach to different mounts; a unique mount is not required for each unique TV. Certain examples are described with respect to VESA™ mounts that correspond to the size of a camera, but any of the VESA™ patterns could be used. In other examples, a non-VESA™ mount can be used (e.g., a mount that is not one of the seven patterns decided on by VESA™).

The present apparatus is a modular mount 200 configured to connect a video-camera with a mounting plate. The example apparatus is shown as discrete components in FIG. 2 and is shown connected in FIG. 3. The example modular mount 200 includes an example mounting plate connector 202, and an example camera socket connector 204.

Figure 2:
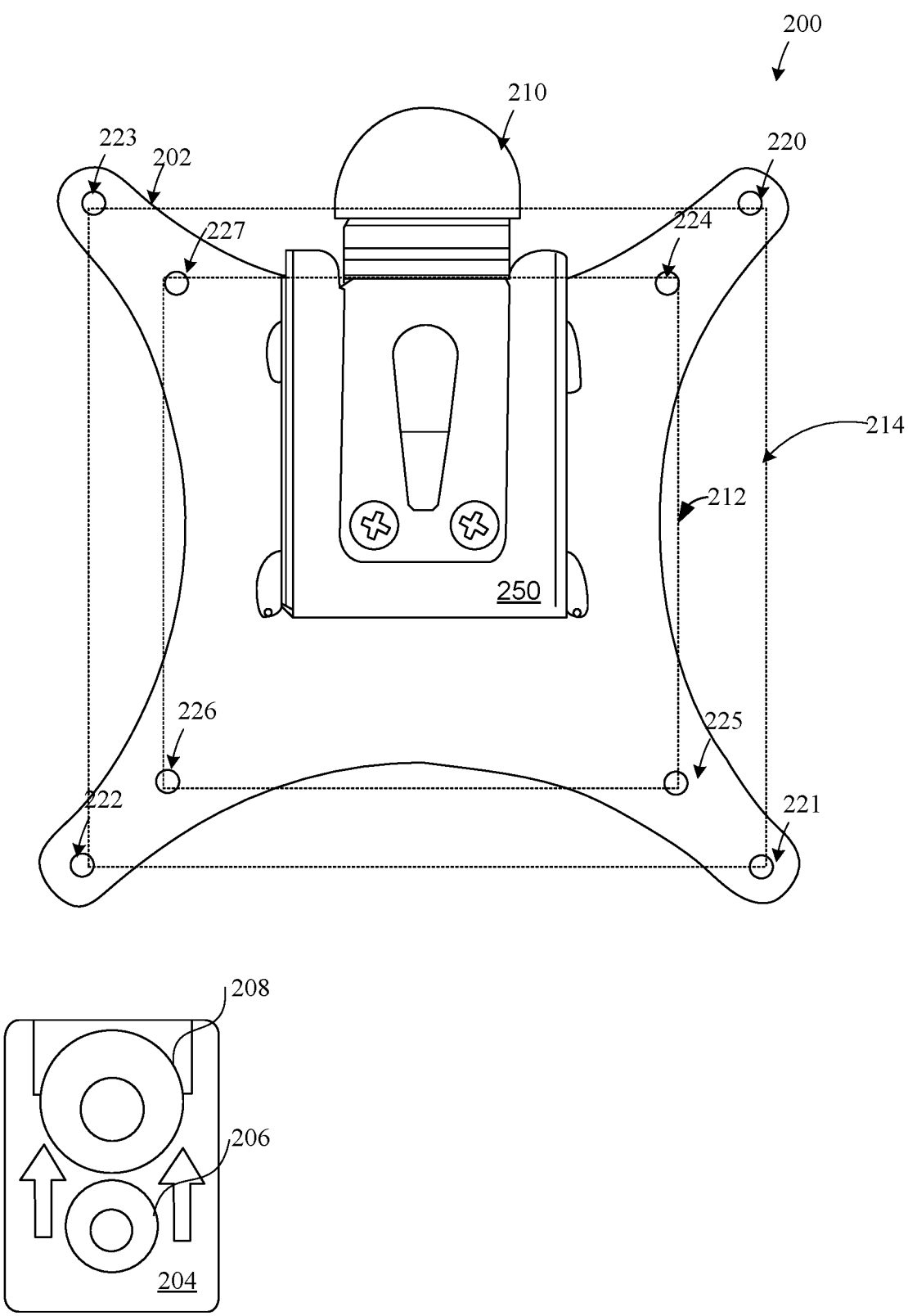
FIG. 2 is an example apparatus to mount a camera to a mounting plate consisting of a first component and a second component.

FIG. 2 illustrates an example modular mount 200 according to teachings of this disclosure shown in discrete components. The example modular mount 200 includes an example mounting plate connector 202 and an example camera socket connector 204. The example modular mount 200 can be affixed and/or positioned using screws, such as ¼ inch screws, ⅜ inch screws, 5/16 inch screws, etc., with or without washers. Turning to the example mounting plate connector 202, the example mounting plate connector 202 is generally configured to connect (e.g., attach, fasten, secure, etc.) to an example mounting plate (e.g., monitor mount, support bracket, display stand, etc.). The example mounting plate connector 202 has example holes 220, 221, 222, 223, 224, 225, 226, and 227, an example quick release mechanism (e.g., quick release tab) 210, and an example camera housing 250.

In some examples, the example modular mount 200 is configured to integrate with VESA™ mounting standards. In these examples, the example mounting plate connector 202 is referred to as a VESA™ plate connector, and the example holes 220-223 are dimensioned according to a first VESA™ pattern and the example holes 224-227 are dimensioned according to a second VESA™ pattern.

In the example of FIG. 2, the example holes 220-223 are spaced according to a first VESA™ mounting standard (e.g., pattern). The example holes 220-223 are spaced apart (e.g., 100 millimeters (mm), 150 mm, 200 mm, etc.) from each other as shown by the dimensions line 214. The example holes 224-227 are spaced according to a second VESA™ mounting standard (e.g., pattern), such that the example holes 224-227 are spaced apart (e.g., 50 mm, 75 mm, 90 mm etc.) as shown by the dimensioning line 212. The example hole 220 and the example hole 224 are in the top right corner as shown in FIG. 2. The example hole 221 and the example hole 225 are in the bottom right corner as shown in FIG. 2. The example hole 222 and the example hole 226 are in the bottom left corner, with the example hole 223 and the example hole 227 in the top left corner, respectively.

In some examples, the first set of attachment holes 220-223 are not aligned according to VESA™ mounting standards. For example, the first set of holes might be spaced out 83.26 mm apart, which is currently not a VESA™ mounting standard. For example, the example holes 220-221 may be spaced (e.g., dimensioned) with a first separation distance such that the example holes 222-223 are spaced with a second separation distance, the first separation distance different from the second separation distance. In some examples, the dimensioning (positioning, location) of the example holes may be customized to align with a specific mounting plate.

In other examples, the size of the example mounting plate connector 202 can be larger to accommodate larger VESA™ plates, such as holes spaced 200 millimeters apart according to another VESA™ standard. In yet other examples, the user (e.g., human, vlogger) may want to install (e.g., operate, use) a 100 mm by 100 mm set up (e.g., a 100 mm configuration) by using example holes 220-224, while installing a 75 mm by 75 mm set up would use example holes 225-228. More details regarding the example hole fastening process are given in FIG. 5.

Turning in detail to the example camera socket connector 204, the example camera socket connector 204 has an example first screw hole 206 and an example second screw hole 208. In the example of FIG. 2, the example first screw hole 206 is dimensioned to accept a ¼ inch screw and the example second screw hole 208 is dimensioned to accept a ⅜ inch screw. However, in other examples, the example first screw hole 206 and the second example screw hole 208 may be dimensioned to accept non-standard camera screws such as ½ inch. The example camera socket connector 204 is symmetrical, such that regardless of which screw is chosen, the example camera socket connector 204 can slide into the example camera housing 250.

Turning in detail to the example quick release mechanism 210, the quick release mechanism 210 is pushed (e.g., depressed, pressed, engaged) in order for the example camera socket connector 204 to slide into the example camera housing 250. The example camera housing 250 protrudes from the example mounting plate connector 202 and is generally configured to receive the example camera and the example camera socket connector 204. The example sliding operation is fully described in FIG. 6 and FIG. 9.

Figure 3:
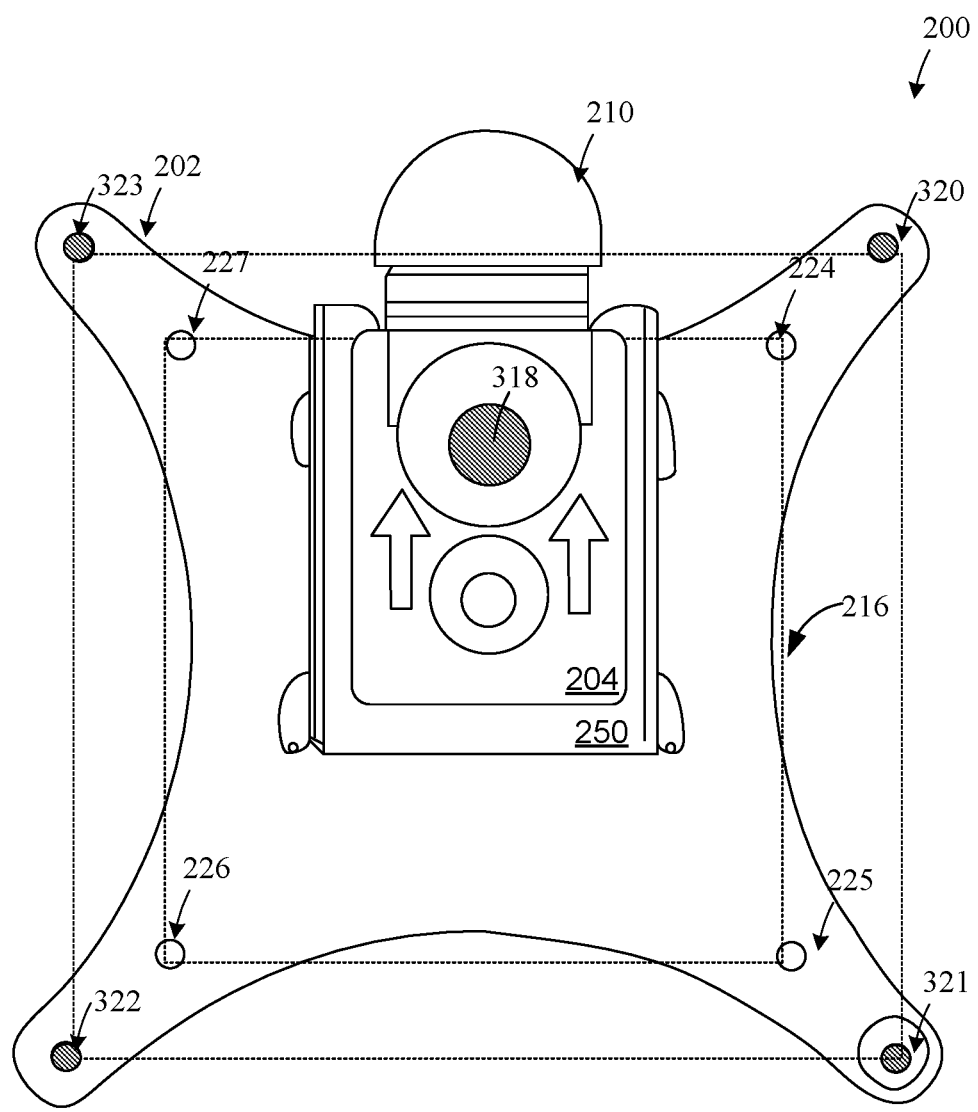
FIG. 3 is the example apparatus to mount a camera to a mounting plate of FIG. 2 connected and in use.

FIG. 3 is a fully attached modular mount 200 according to the teachings of this disclosure. The example camera socket connector 204 is fastened by the example second screw hole 208 and an example screw (represented by the grey solid circle 318) to an example camera (not shown). The example mounting plate connector 202 is fastened by the thumbscrews and washers through the holes (represented by the small grey solid circles 320, 321, 322, 323) to an example mounting plate (not shown in this view). The example camera socket connector 204 is fastened to the example mounting plate connector 202 though the example quick release mechanism 210 and the example camera housing 250. In the example of FIG. 3, the example modular mount 200 is configured to mount a camera to a VESA™ plate. In other examples, the second example hole with a different sized screw could be used, such as an example ¼ inch screw. FIG. 3 is a front view of FIG. 8 if the camera of FIG. 8 and the mounting plate of FIG. 8 were removed, and the side view of FIG. 8 was a front view.

Figure 4A:
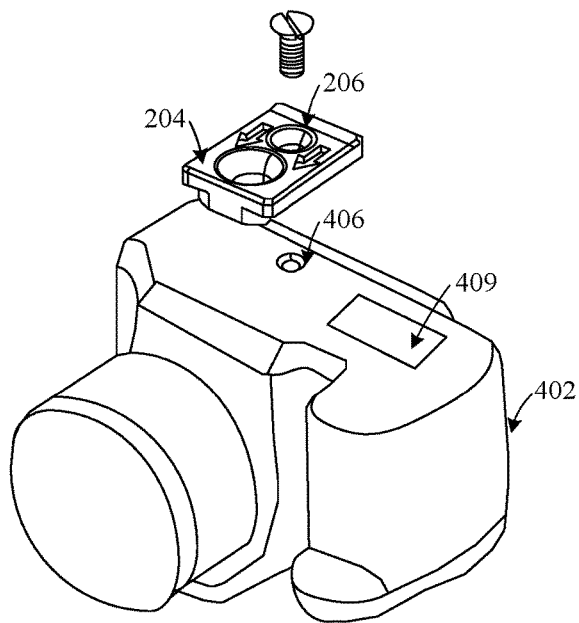
FIGS. 4A-D illustrate example interconnections or mountings of an example camera and an example camera socket connector.
Figure 4C:
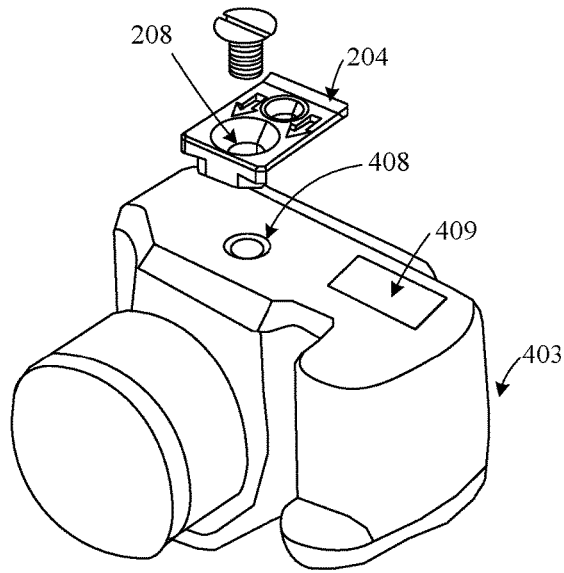

FIGS. 4A-D illustrate example interconnections or mountings of the example camera socket connector 204 to an example camera 402-403 using an example fastener such as a screw. FIG. 4A shows an example camera 402 with an example first socket screw hole 406, while FIG. 4C shows an example camera 403 with a second example socket screw hole 408. In the example of FIGS. 4A and 4C, the example first socket screw hole 406 is ¼ inch, and the second example socket screw hole 408 is ⅜ inch. However, in other examples, the size of the example socket screw hole can be different (e.g., ½ inch) based on the specification of the camera manufacturer. The example camera socket connector 204 is dimensioned to receive the example first socket screw hole 406 and the example second socket screw hole 408. As such, the example modular mount 200 can accommodate to a wide variety of cameras.

In some examples, the example camera 402 is a digital single lens reflex (DSLR) camera. Typically, DSLR cameras include at least one socket screw hole for attachment to a tripod (not shown). The example camera 402 has an example battery cover 409. The example battery cover 409 is removable to allow for removal and replacement of the camera battery. The example camera socket connector 204 is small enough and/or otherwise positioned to not block the example battery cover 409, which allows for quick removal of the battery. Despite the small size, the sturdy structure of the example camera socket connector 204 supports the weight of the example camera 402. In some examples, DSLR cameras weigh between 1.5 and 2.5 pounds. The example camera socket connector 204 does not have to be removed (e.g., unfastened, unattached) to replace the camera battery, and the example camera 402 and the example camera socket connector 204 can together slide out of the example mounting plate connector 202 (FIG. 2).

Figure 4B:
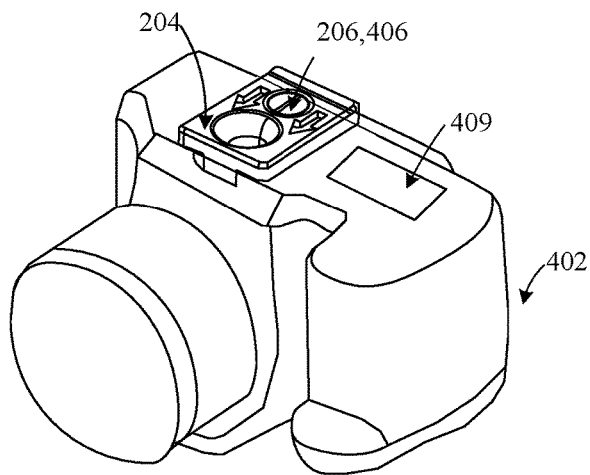

FIG. 4B shows the example camera socket connector 204 attached to the example camera 402. As seen in the example of FIG. 4B, the example battery cover 409 is not hindered by the attachment of the example camera socket connector 204, allowing for replacing of batteries without unfastening the example camera socket connector 204 from the example camera 402. As shown in the example of FIG. 4B, the example first screw hole 206 of the example camera socket connector 204, the example first screw hole 406 of the example camera 402, and the screw are all dimensioned to the same specifications to allow for attaching the example camera socket connector 204 to the example camera 402.

Figure 4D:
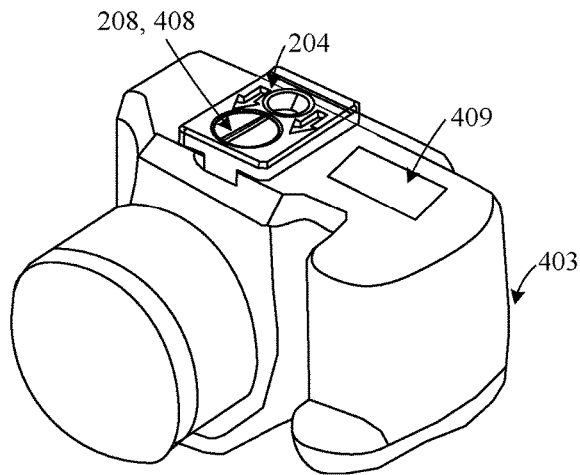

FIGS. 4C-D are similar to FIGS. 4A-B, except that the example camera 403 has a different-sized socket screw hole (e.g., example second socket screw hole 408) instead of the example socket screw hole 406 of FIGS. 4A-B. Accordingly, an appropriately-sized screw is used along with the example hole 208 of the example camera socket connector 204. The example camera socket connector 204 is symmetrical such that either the first orientation in FIG. 4A or the second orientation in FIG. 4C can be attached to the example camera housing of the example mounting plate connector 202 of FIG. 2. In either orientation (e.g., a ¼ inch orientation or a ⅜ inch orientation), the example battery cover 409 is not hindered (e.g., obstructed or otherwise rendered inoperable) by the example camera socket connector 204.

Figure 5:
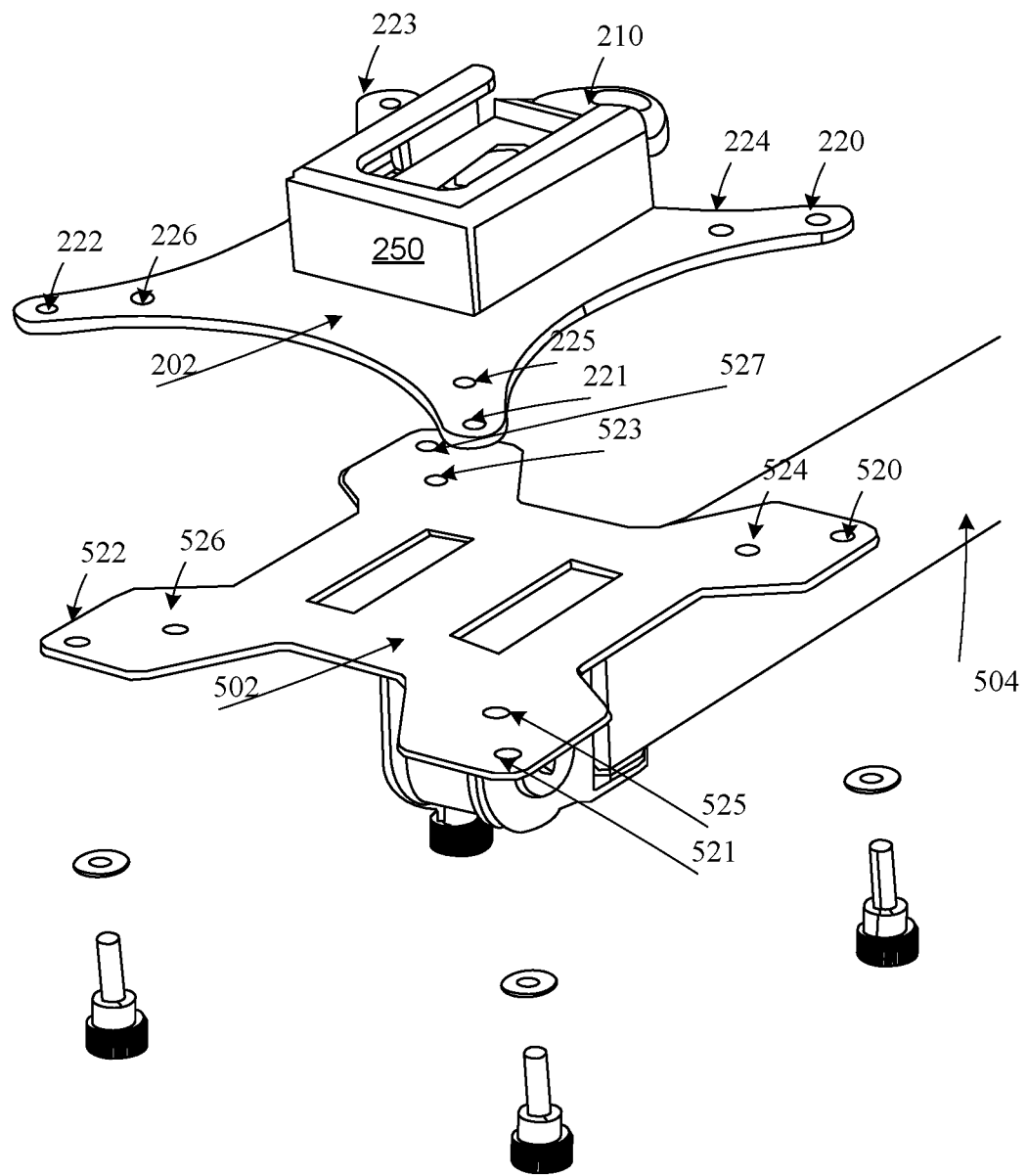
FIG. 5 is an example exploded view of an example mounting plate and mounting plate connector.

FIG. 5 is an exploded view of the example mounting plate connector 202, an example mounting plate 502, an example mounting arm 504 and some thumb screws and washers. Due to the isometric view, not all components are shown in the example view of FIG. 5. For example, there are four thumbscrews, eight holes, and four washers used to assemble the example mounting plate connector 202, but only three thumbscrews, seven holes, and three washers are shown due to the orientation of the view of FIG. 5. The components that are not shown/depicted in this example behave the same way as their corresponding counterparts that are shown in the example of FIG. 5.

Figure 10:
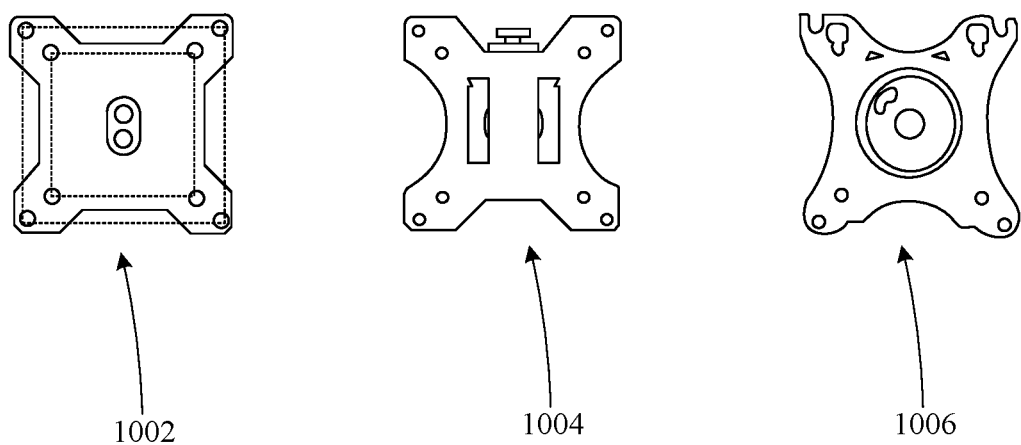
FIG. 10 is an example of alternative mounting plates.

The example mounting plate 502 and example mounting arm 504 are typically used to mount TVs. Collectively, the example mounting plate 502 and the example mounting arm 504 may be referred to as a "monitor mount", "desk mount", or "monitor stand." In some examples, the example mounting plate 502 (e.g., VESA™ plate 502) is specifically dimensioned in order to mount VESA™ compliant flat screen TVs. Other variations of mounting plates in terms of structure, size, weight capacity can be used as seen in FIG. 10. In the example of FIG. 5, the example mounting plate 502 includes a first set of example holes 520, 521, 521, 523, spaced apart (e.g., dimensioned, positioned) such that the first set of example holes 520-523 lines up with the example holes 220-223 of the example mounting plate connector 202. The example second set of example holes 524, 525, 526, 527 is spaced apart (e.g., dimensioned, positioned) such that the example set of holes 524-527 are aligned with the example set of holes 224-227 of the example mounting plate connector 202. In some examples, the example holes 520-527 are referred to as attachment holes.

In some examples, the first set of example holes (e.g., attachment holes) 520-523 and the first set of example holes 220-223 are spaced apart by 100 millimeters as specified in a first VESA™ standard. In other examples, the second set of example holes 224-227 and the example second set of example holes 524-527 are spaced apart by 75 millimeters as specified in a second VESA™ standard. Some individuals own mounting arms with mounting plates, while desiring an overhead style camera shot. The example modular mount 200 is able to use the previously owned mounting arms and mounting plates in order to attach a camera. Some of the mounting plates 502 owned by individuals are VESA™ compliant such that the mounting plates are used to attach flat screen TVs, so the example mounting plate connector 202 typically may be dimensioned according to VESA™ compliant standards, but the example mounting plate connector 202 is novel regardless of the dimensioning of the holes.

Returning to FIG. 5, an example method of fastening the example mounting plate connector 202 and the example mounting plate 502 includes using a system of four thumbscrews and four washers. A first thumbscrew and a first washer are thread through a first hole (e.g., hole 521 of the example mounting plate 502) and a first corresponding hole (e.g., hole 221 of the example mounting plate connector 202). This process continues with the other three holes. In some examples, the mounting plate connector 202 is dimensioned with either less holes (e.g., 1, 2, 3) or more holes (e.g., 5, 9, etc.). In these examples, the mounting plate connector 202 is fastened (e.g., attached, mounted, etc.) to the mounting plate 502 based on the corresponding number of holes included in the mounting plate connector 202.

Once the example mounting plate connector 202 is fastened to the example mounting plate 502, the attached combination of the example mounting plate connector 202 and the example mounting plate 502 is ready to accept the attached combination of the example camera socket connector 204 (FIG. 4B) and camera 402 (FIG. 4B) in the example camera housing 250. In other examples, the attached combination of the example mounting plate connector 202 and the example mounting plate 502 is ready to accept the attached combination of the example camera socket connector 204 (FIG. 4D) and camera 403 (FIG. 4D) in the example camera housing 250. The example combination of the example camera socket connector 204 and the example camera 402 received by the combination of the example mounting plate connector 202 and the example mounting plate 502 is secured in place through use of the quick release mechanism 210. In some examples, the example camera housing 250 is integrated (fused, composed, structurally united, etc.) into the example mounting plate connector 202. In certain examples, the camera housing 250 can be implemented as a quick release clamp, a quick release base plate, a quick release mount base, or a quick change adapter, etc. In these examples, the camera housing 250 is specifically dimensioned (e.g., shaped) to connect to a mounting plate 502 such that the camera housing 250 includes material that aligns with the attachment holes of the mounting plate. In other examples, the camera housing 250 is a quick release clamp to receive a quick release plate (e.g., the camera socket connector 204, a sliding plate).

In other examples, an alternative method of fastening the example mounting plate 502 to the example mounting plate connector 202 is used. For example, an adhesive like tape, or a magnetic bond, or a vice grip/clamp, or welding/fusing of the two components can be used to secure the example mounting plate 502 to the example mounting plate connector 202.

Figure 6A:
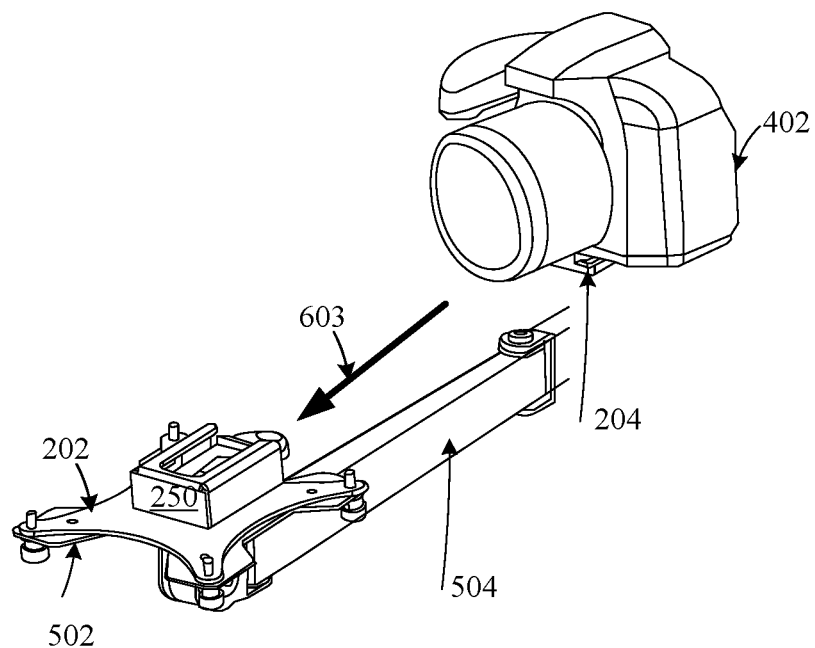
FIGS. 6A-B illustrate the sliding ability of the example apparatus.

FIG. 6A illustrates the sliding feature of the example mounting plate connector 202 and the example camera socket connector 204. FIG. 6A begins with the example mounting plate 502 firmly attached to the example mounting plate connector 202. While the example camera 402 of FIG. 4A-B is shown in FIG. 6A to illustrate the interaction between the example mounting plate connector 202 and the example camera socket connector 204, the example camera 402 is used for the purposes of illustration only. Other cameras, such as the example camera 403, etc., can also be removably attached using the example mounting plate connector 202 and the example camera socket connector 204 as shown in FIG. 6A. In the example of FIG. 6A, the example camera 402 is representative of other cameras with other sized socket holes. The example camera 402 is firmly attached to the example camera socket connector 204 such that the weight of the camera is supported and the example battery cover 409 (not shown in this view) is unblocked. Based on where the example camera 402 is floating in space in FIG. 6A, a user could replace the battery with a fully charged battery, before sliding the example camera into the example mounting plate connector 202 without detaching the example camera socket connector 204.

The example camera socket connector 204 is symmetric so either camera (camera 402 or camera 403) would slide in the same way. For example, the aperture of the camera 402 slides forward with the example camera socket connector 204 in a first orientation, while the example camera socket connector 204 is in a second orientation such that the aperture of the camera 403 would also slide forward. The attached combination of the example camera 402 and the example camera socket connector 204 follows the arrow 603 to slide into place in the example camera housing 250 (e.g., camera socket housing) of the example mounting plate connector 202. The attached combination of the example camera 402 and the example camera socket connector 204 snaps (e.g., clicks, locks) in place due to the example quick release mechanism 210 (further described in FIG. 9). The example quick release mechanism 210 allows the attached combination of the example camera 402 and the example camera socket connector 204 to be removably coupled to the combination of the example mounting plate connector 202 and the example mounting plate 502. As used herein, "removably coupled" means able to be attached or detached, easily without the use of tools such as screws or hammers. The example quick release mechanism 210 allows the example camera 402 and the example camera socket connector to slide into the example camera housing 250. The example quick release mechanism 210 allows for attachment and release without a screw or other fastener for the example camera 402 and the example camera socket connector 204.

Figure 6B:
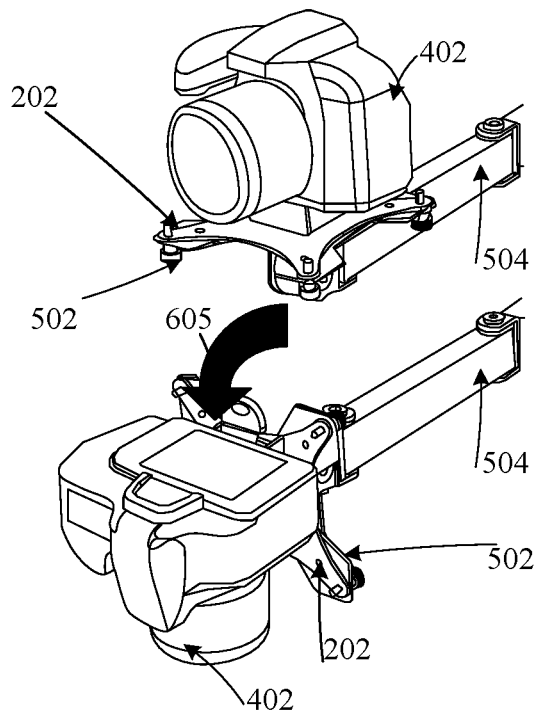

FIG. 6B shows that once the example mounting plate connector 202 and the example camera socket connector 204 are connected, the example camera 402 is connected to the example mounting plate 502. Once the example camera 402 is connected to the example mounting plate 502 (e.g., via the example camera socket connector 204), a tilt joint or another rotatable joint can be used to rotate the camera downwards following arrow 605 to achieve a top-down view as described in FIG. 1B.

Figure 7:
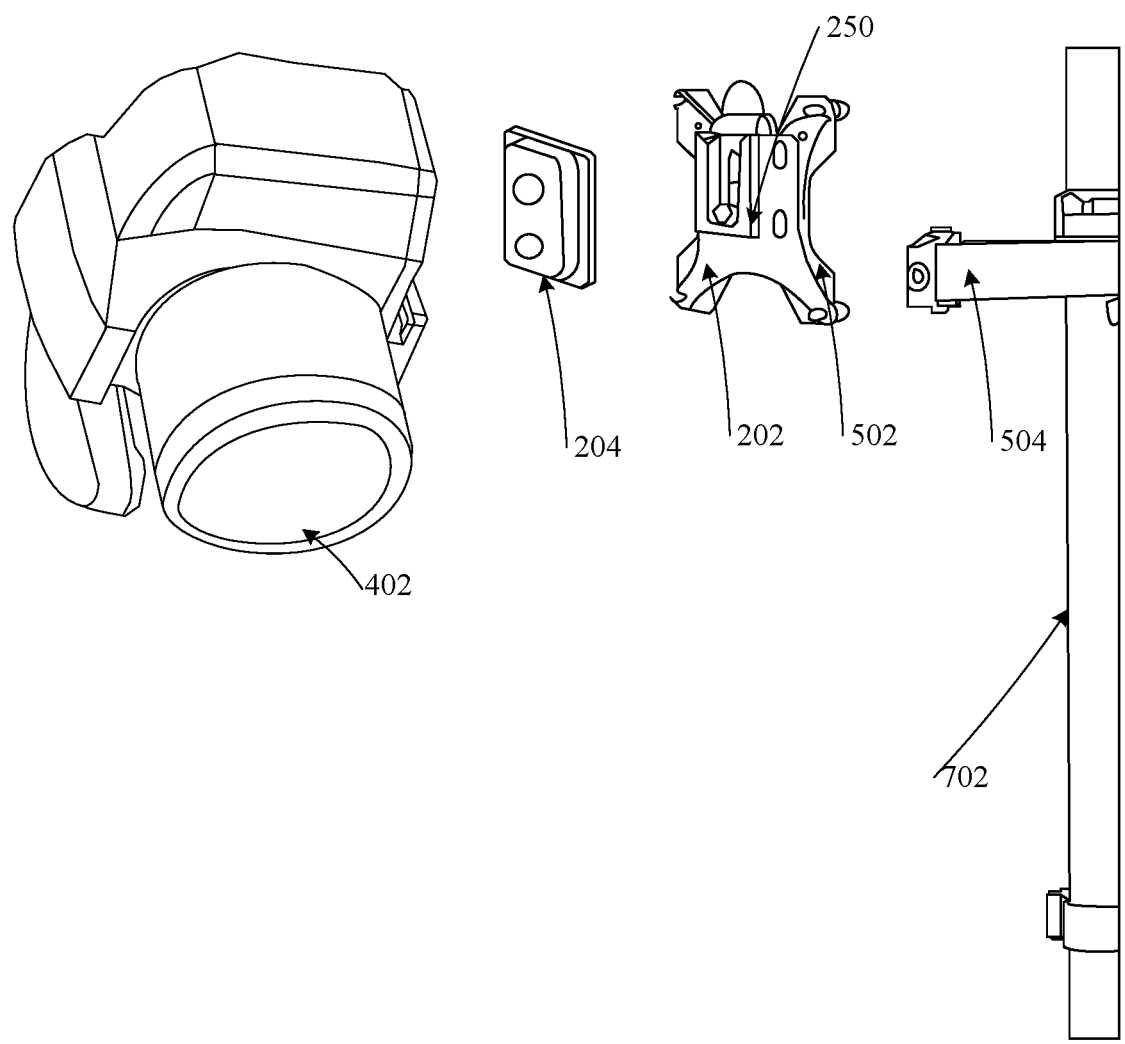
FIG. 7 is an example exploded view of an example mounting pole, an example mounting plate, an example mounting plate connector, an example camera, and an example camera socket connector.

FIG. 7 is an example illustration of the components. In FIG. 7, the example camera 402 is shown floating next to the example camera socket connector 204 which is next to an attached example mounting plate connector 202 and example mounting plate 502 floating next to an example mounting arm 504 which is attached to a table pole 702. The example mounting arm 504 and table pole 702 may be connected to a table or a desk (that is not shown). The orientation of the camera is able to capture a top-down view by the attachment to a mounting plate 502 and mounting arm 504 In some examples, a user may remove an example TV (not shown) that was attached to an example mounting arm 504 and example mounting (VESA™) plate 502, attach a mounting plate connector 202 to the example mounting plate 502, and slide the example camera 402 and example camera socket connector 204 in to the example camera housing 250 of the example mounting plate connector 202.

Figure 8:
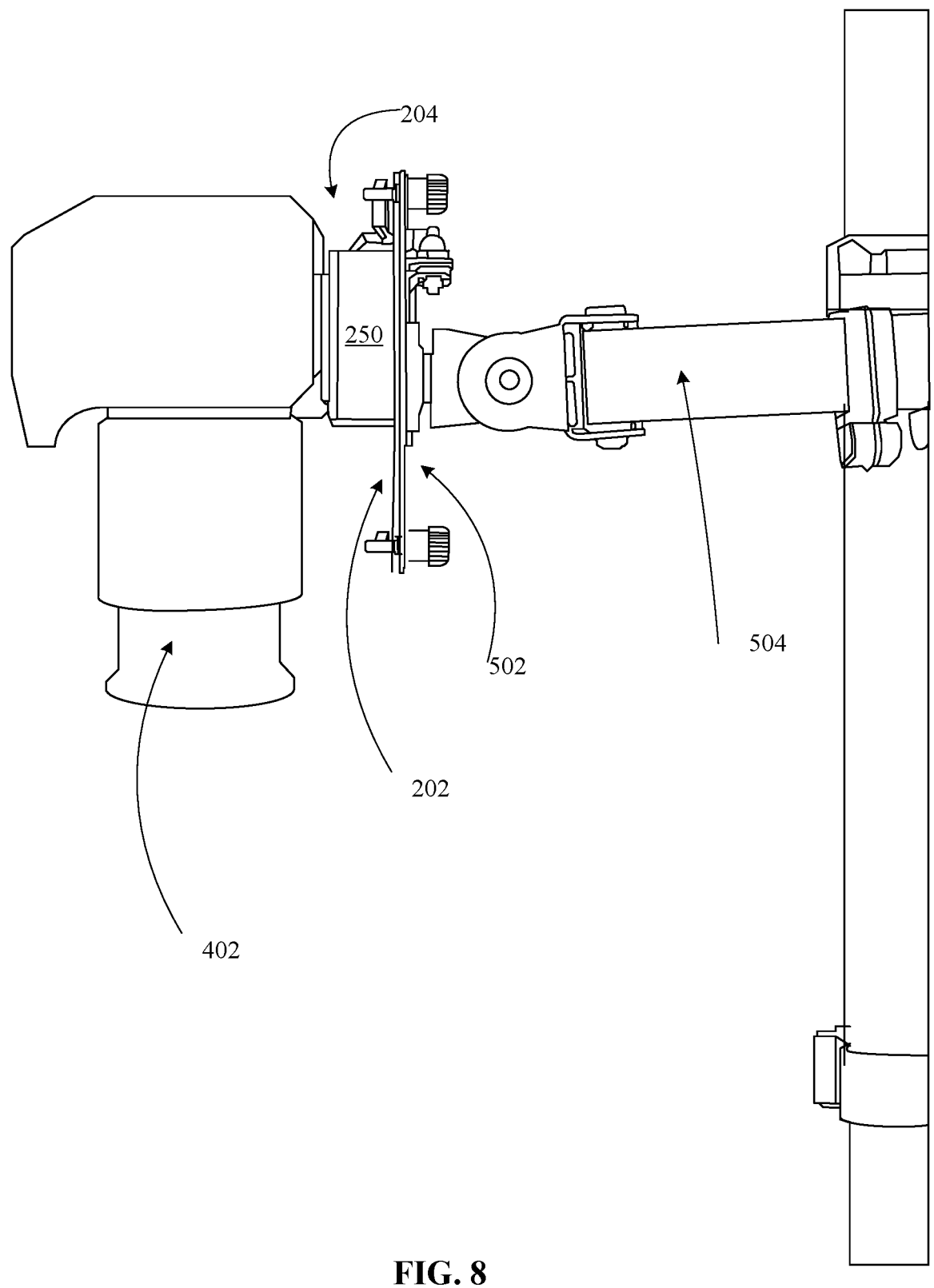
FIG. 8 is an example side view of an example mounting pole, an example mounting plate, an example mounting plate connector, an example camera, and an example camera socket connector.

FIG. 8 shows FIG. 7 in an attached state. The side view of FIG. 8 shows the example camera 402 attached to the example camera socket connector 204, which is attached to the mounting plate connector 202, which is attached to the mounting plate 502 attached to the example mounting arm 504. The sideview illustrates how little space the apparatus occupies and the how the apparatus is used in practice. The example mounting plate 502 and example mounting arm 504 can be adjusted to any height along the example pole 803. The example camera housing 250 hides (e.g., obscures) the example camera socket connector 204 from view in the example of FIG. 8, but the arrow indicates an approximate location of the example camera socket connector 204 (not shown in this view) on the other side of the example camera housing 250.

Figure 9A:
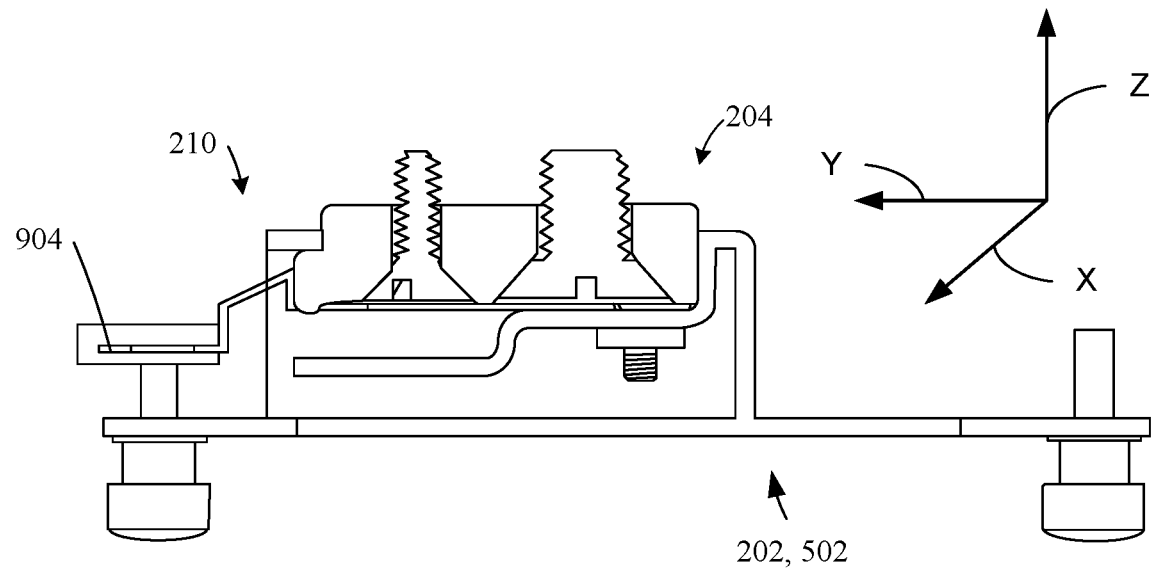
FIG. 9A is a cut-away view of a quick release mechanism of the camera socket connector and the example mounting plate connector.

FIG. 9A is a first perspective view of the example modular mount 200 including the example quick release mechanism 210, the example camera socket connector 204, the example mounting plate connector 202, and the example mounting plate 502. The example of FIG. 9A includes a coordinate system such that the Z-axis pointing upwards, the Y-axis pointing along the length of the example camera socket connector 204, and the X-axis pointing along the width of the example camera socket connector 204. The cut-away view of the example of FIG. 9A shows how the example camera socket connector 204 is able to slide into the example camera housing 250 of the example mounting plate connector 202. The example quick release mechanism 210 includes an example lever 904 that when pressed down is able to bend and allow the example camera socket connector 204 to slide in or slide out. The natural state of the example quick release mechanism 210 is in the locked position, which secures the example camera socket connector 204. Due to the structure of the example quick release mechanism 210, such that even if the mounting plate were to rotate, the example camera 402 and example camera socket connector 204 would not fall out of the example camera housing 250. For example, the camera could rotate like shown in FIG. 6B to achieve a top-down image capture or could rotate to achieve a bottom-up image capture of the ceiling. The camera is released by pushing the example lever 904 of the example quick release mechanism. The example quick release mechanism is known as a quick release because the time to attach the camera to the mounting plate is significantly faster (e.g., quicker) than the time required to manually attach the camera to a mounting plate through other methods such as adhesives, vice grips, or magnets.

Figure 9B:
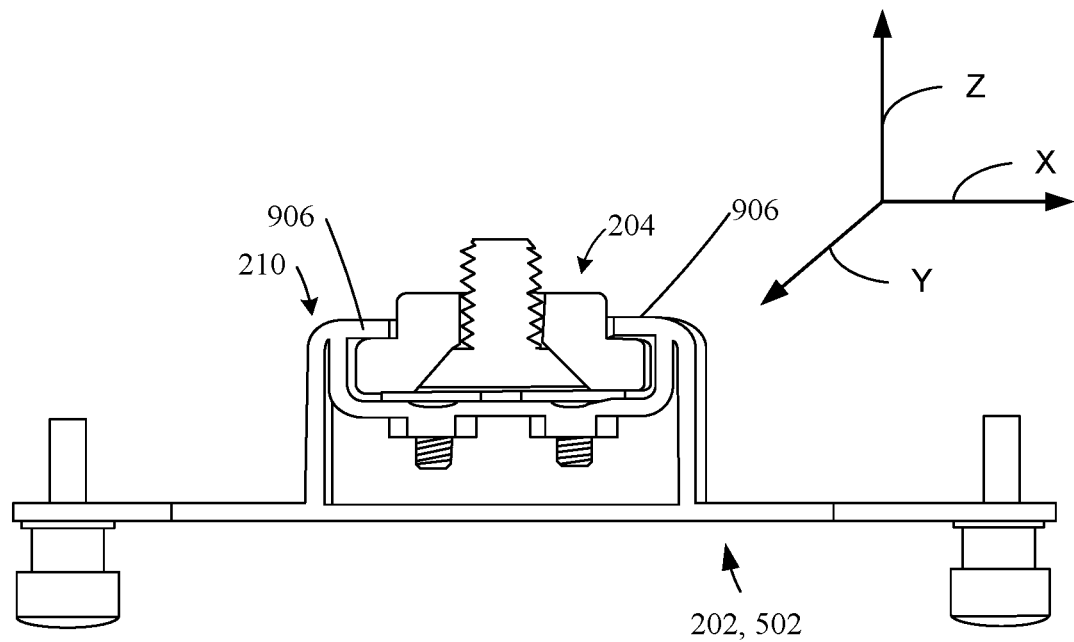
FIG. 9B is an alternative view of the example quick release mechanism of the camera socket connector and the example mounting plate connector.

FIG. 9B is a rotated view of FIG. 9A such that the mounting plate is rotated 90 degrees counter-clockwise (e.g., to the right). FIG. 9B shows an example overhang 906 of the example camera housing configured to secure the combination of the example camera socket connector 204 and the example camera 402.

FIG. 10 is an illustration of alternate example mounting plates 1002, 1004, 1006. In some examples, the example mounting plates 1002, 1004, 1006 are VESA™ compliant plates, such that the dimensioning of the holes corresponds to a VESA™ pattern such as 100 mm and or 75 mm. FIG. 10 illustrates how the example modular mount 200 (FIG. 2) can be dimensioned to attach to any standard mounting plate including, but not limited to VESA™ compliant plates.

Figure 11:
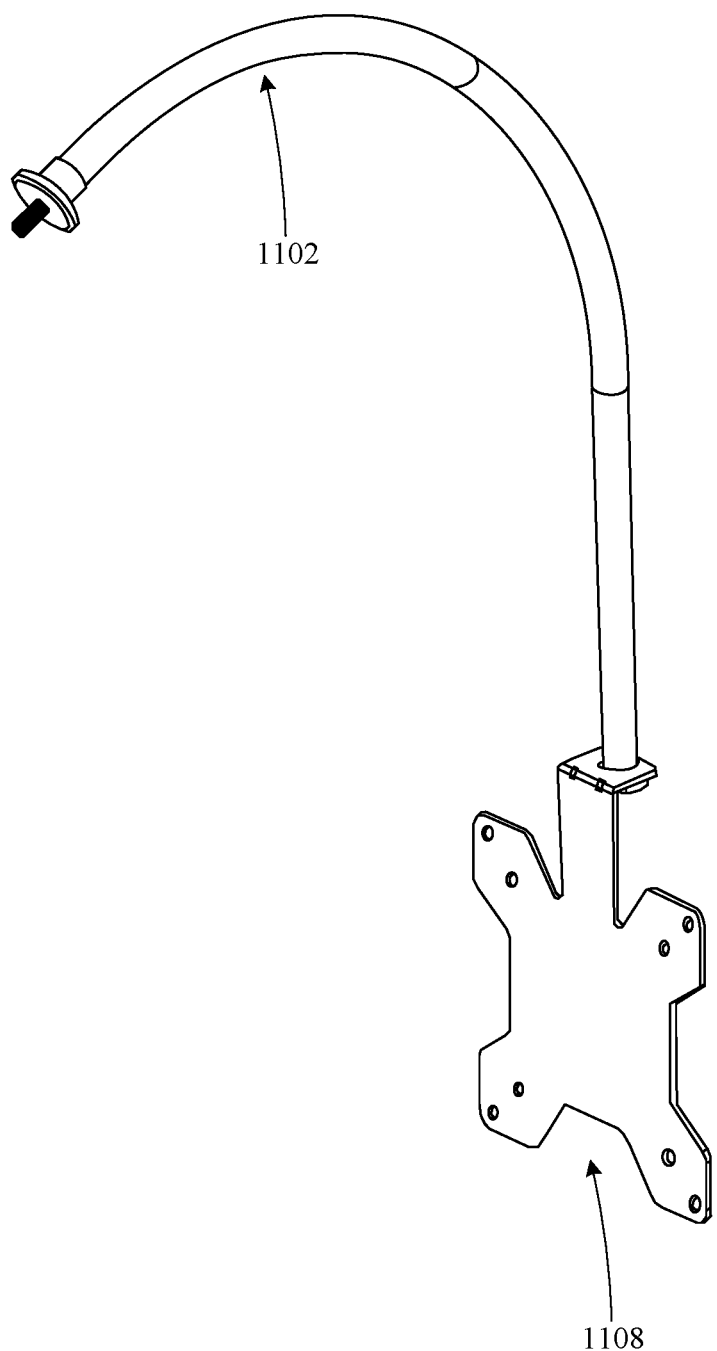
FIG. 11 is an example flexible goose-neck mounting plate connector.

FIG. 11 is an example flexible goose-neck mounting plate connector. The camera socket connector is now a long flexible tube 1102. The example camera socket connector has a screw dimensioned to attach to the camera tripod socket screw hole. In some examples, an alternative screw configured to attach to the camera socket screw hole replaces the original screw. The example tube 1102 is connected to the mounting plate 1108 which is connected to a mounting arm (not shown in this view). This implementation connects the camera to a mounting plate 1108 through the transitive property of the flexible tube 1102. In some examples, a user may still have a TV attached to the mounting plate 1108, and the example camera attached to the end of the example long flexible tube 1102. In these examples, the user is able to watch the TV while recording original top-down footage with the camera set-up.

Figure 12:
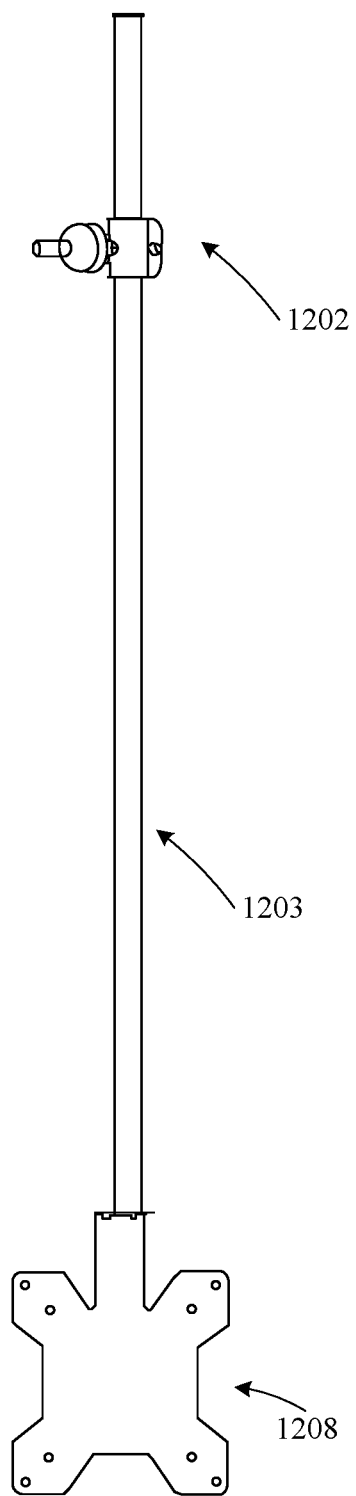
FIG. 12 is an example extendible riser mounting plate connector.

FIG. 12 is an example extendible riser mounting plate connector. The camera socket connector has been configured as a ring-shaped (e.g., washer, nut, fastener) camera socket connector 1202 that connects to a long rigid pole (e.g., straight tube, straight rigid tube) 1203. The example ring-shaped camera socket connector 1202 is able to attach to the camera socket hole. The example ring-shaped camera socket connector 1202 is able to slide to any height (e.g., position) allowing for top-down images captured at different heights. The example long rigid pole 1203 attaches to the mounting plate 1208, which is attached to a mounting arm (not shown). An example benefit for the example of FIG. 12 is to achieve a view significantly higher than the height of the mounting plate 1208. In some examples, the example mounting plate 1208 is attached to a desk which does not have enough height to capture the target (e.g., desired) shot. Similar to FIG. 11, a TV may be attached to the example mounting plate 1208, while the camera is attached to the example ring-shaped camera socket connector 1202.

Figure 13:
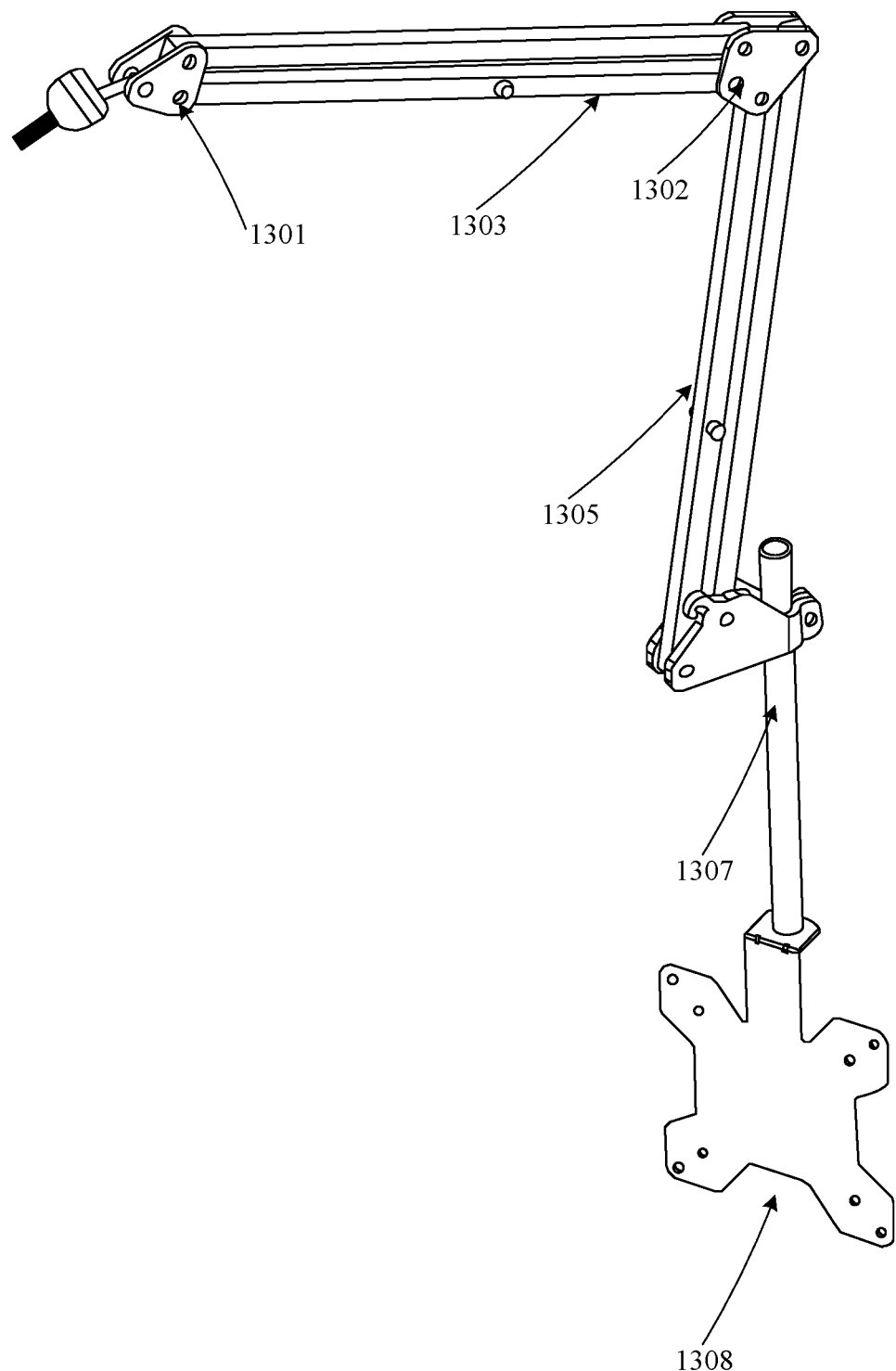
FIG. 13 is an example suspension boom mounting plate connector.

FIG. 13 is an example suspension boom mounting plate connector. The example camera socket connector is modified into an example clamp 1301. The example clamp 1301 is attached to a first example mounting arm 1303, which is connected to an example second mounting arm 1305 by a hinge 1302. The example second mounting arm 1305 is connected a rigid pole 1307 which is connected to an example mounting plate 1308. The example configuration of FIG. 13 allows for a system that the extends allowing both longitudinal and lateral distance (e.g., area) to be covered. Typically, the camera is attached to the example mounting plate 1308 through the example mounting plate connector 202 of FIG. 2, which limits the position the camera is allowed to occupy. However, in the example of FIG. 13, the camera is attached to the clamp 1301 and allowed a much wider range of possible positions to capture a top-down shot.

Figure 14:
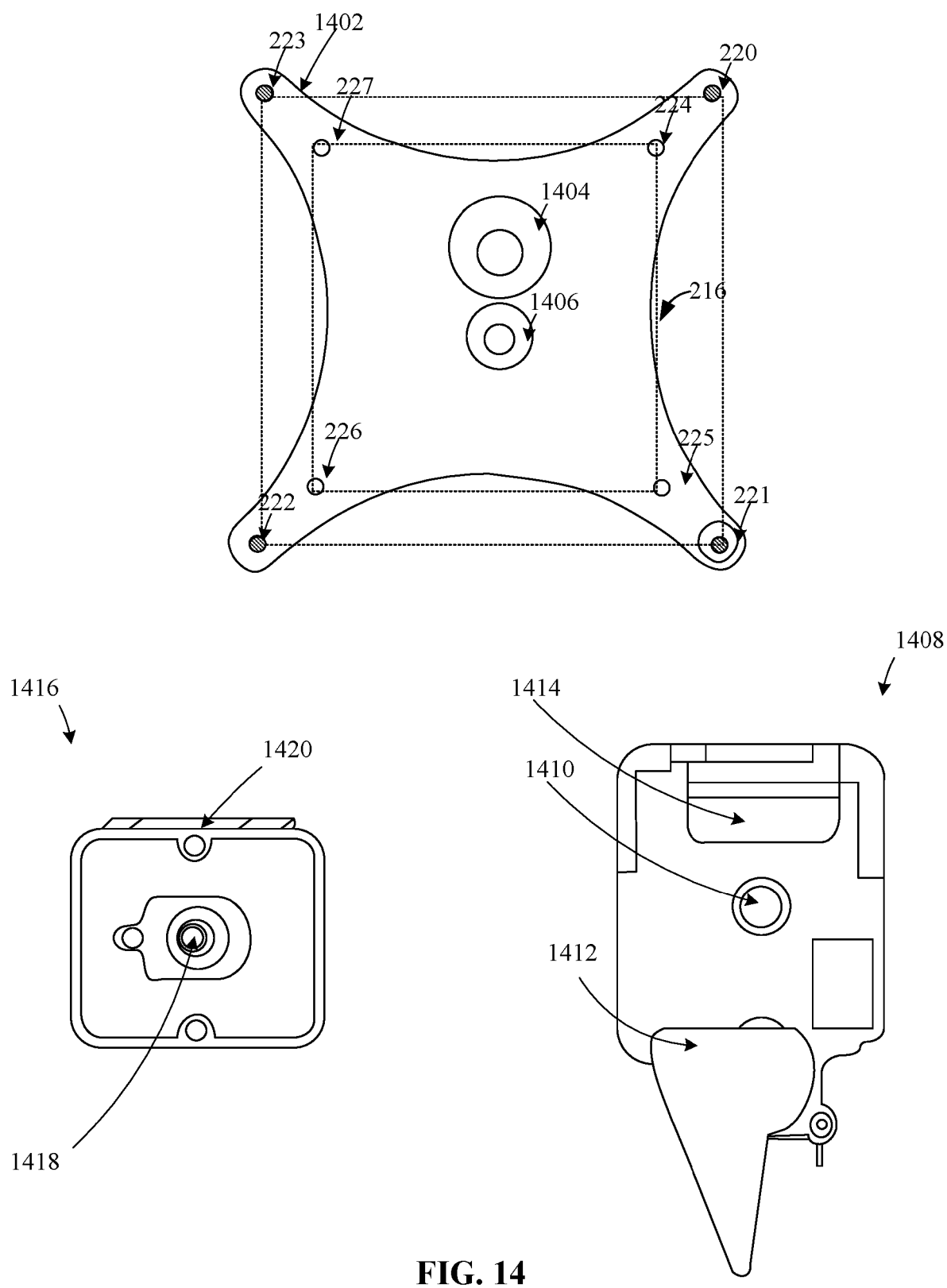
FIG. 14 is an example variant of an alternative configuration to attach a camera to a mounting plate through a traditional quick release plate.

FIG. 14 is an example of a camera mount implemented with a quick release plate connector. As shown in the example of FIG. 14, a camera can be attached to a mounting plate through a quick release plate. An example alternative mounting plate connector 1402 is similar to the example mounting plate connector 202 with respect to the configuration of holes 220-227 dimensioned to connect to a mounting plate (e.g., mounting plate 502). In the example of FIG. 14, the example mounting plate connector 1402 does not include a camera housing (e.g., camera housing 250 of FIG. 2). The example alternative mounting plate connector 1402 instead includes a first screw 1404 and a second screw 1406, wherein the screws are sized differently. The first screw 1404 and/or the second screw 1406 is dimensioned to accept a camera (not shown in this view). In some examples, the camera is directly attached (e.g., mounted, connected) to the alternative mounting plate connector 1402 which is in turn directly attached to the mounting plate (not shown in this view) by connectors (e.g., thumbscrews and washers, etc.) via at least two of the example holes 220-227. In the example of FIG. 14, the thumbscrews and washers connect the alternative mounting plate connector 1402 to the mounting plate through the use of example holes 220-223.

In other examples, the first screw 1404 and/or the second screw 1406 is dimensioned to accept a quick release base 1408. The example quick release base 1408 may be described as a base clamp, a quick release plate receiver, or a quick change camera adapter. For example, the quick release base 1408 can be a Manfrotto 323 RC2 System Quick Release Adapter with 200PL-14 Plate, SmallRig Arca-Type Quick Release Baseplate, Ulanzi Claw Quick Release Plate Tripod QR Camera Mount Adapter, etc. The example quick release base 1408 includes a screw hole 1410 which is dimensioned to connect to the example mounting plate connector 1402 via the screw 1404 or the screw 1406. The example quick release base 1408 includes a clamp 1412 which secures a quick release plate 1414. In the example of FIG. 14, the example quick release base 1408 includes a slotted opening 1414. The example quick release plate 1414 (e.g., a sliding plate) is dimensioned to slide into the quick release base 1408 and includes a screw 1418 for attaching to a camera (not shown in this view). The example quick release plate 1416 includes an example ridge 1420 that is configured to connect into the example slotted opening 1414 of the example quick release base 1408. As such, in certain examples, the mounting plate connector 202 of FIG. 2 can be implemented as a standard quick release base 1408 that has been redesigned to include extra material (e.g., metal) and attachment holes at specific distances (e.g., 100 mm by 100 mm) to attach to a mounting plate 502 (not shown in this view).

Figure 15A:
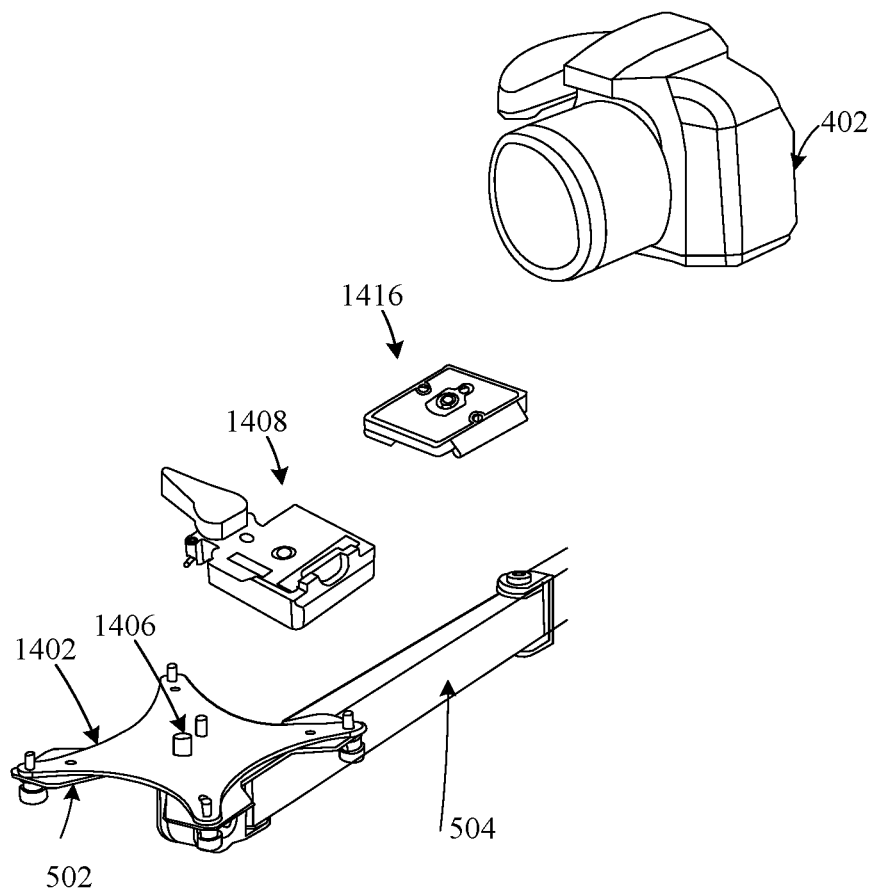
FIG. 15A is an example exploded view of the alternative configuration of FIG. 14 and an example mounting plate.

FIG. 15A is an example exploded view of the alternative configuration of FIG. 14 and an example mounting plate. FIG. 15A illustrates the example camera 402, the example quick release plate 1416, the example quick release base 1408, the example alternative mounting plate connector 1402, the example screw 1406, the example mounting plate 502, and the example mounting arm 504. The example mounting plate 502 is fastened to the example mounting arm 504 and the example alternative mounting plate 1402. The example camera 402 includes a camera socket hole (not shown in this view) that allows the example camera 402 to attach directly to the screw 1406 of the example alternative mounting plate connector 1402. In the example of FIG. 15A, the commercially available example quick release base 1408 attaches directly to the example screw 1408. The example quick release plate 1416 includes a screw 1418 which connects to the camera socket hole (not shown in this view) attaching the example quick release plate 1416 to the example camera 402. The example quick release plate 1416 is removably coupled to the example quick release base 1408.

Figure 15B:
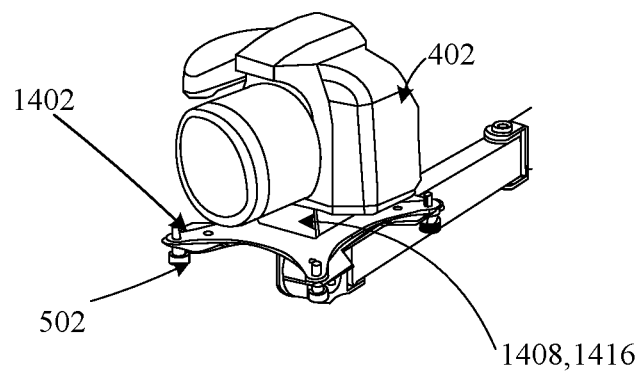
FIG. 15B is a view of the alternative configuration of FIG. 14 connected and in use.
Figure 16:
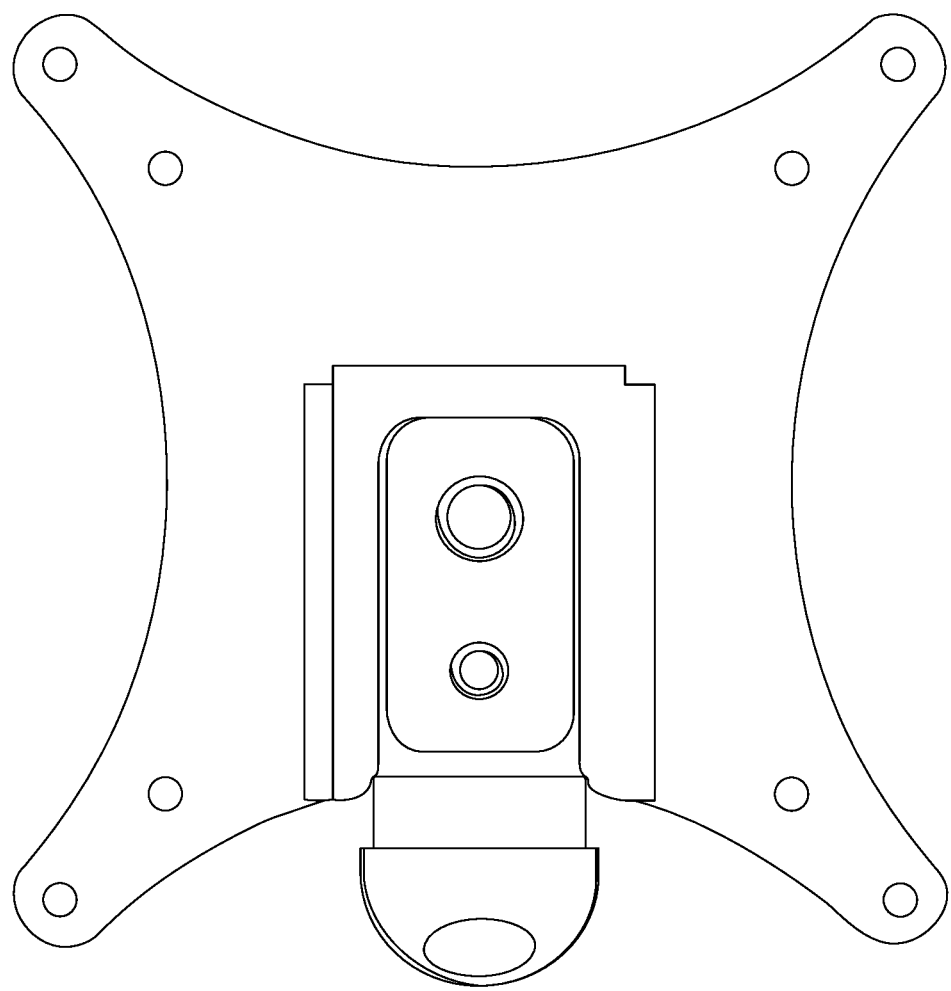
FIGS. 16-21 illustrate additional views of the example mounting plate connector and the example camera socket connector.
Figure 17:
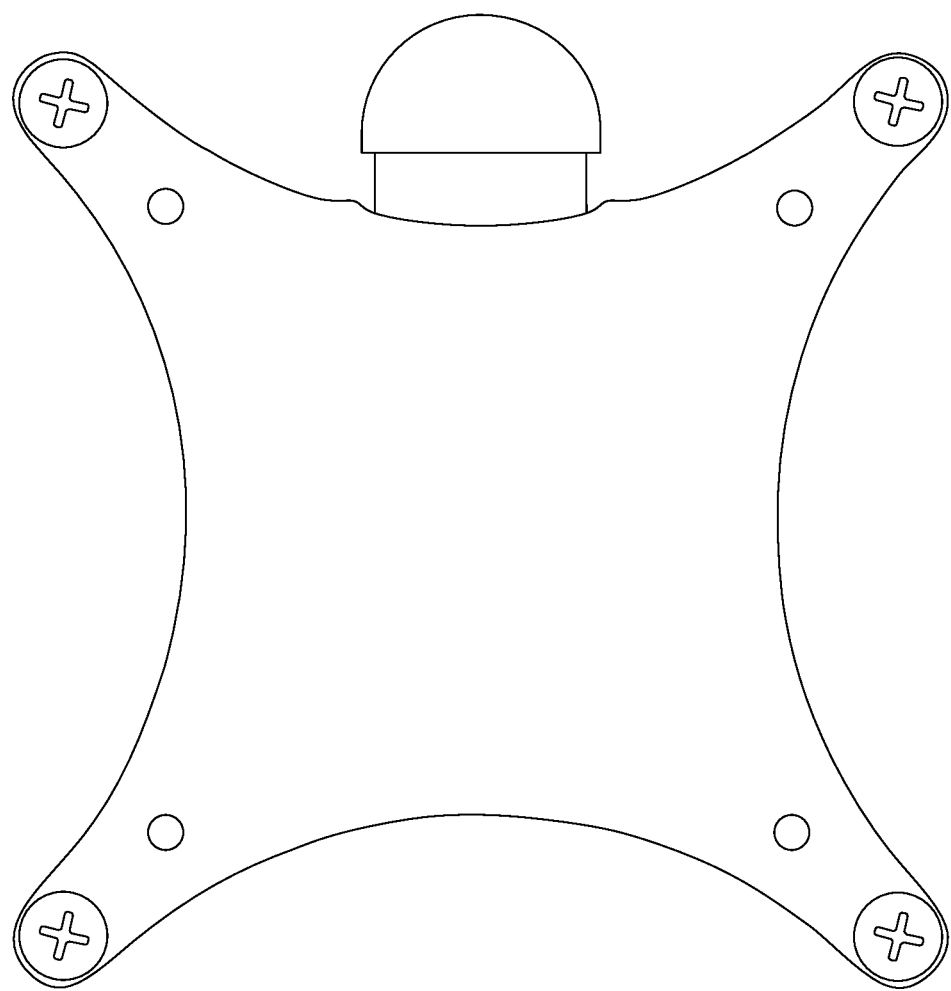
Figure 18:
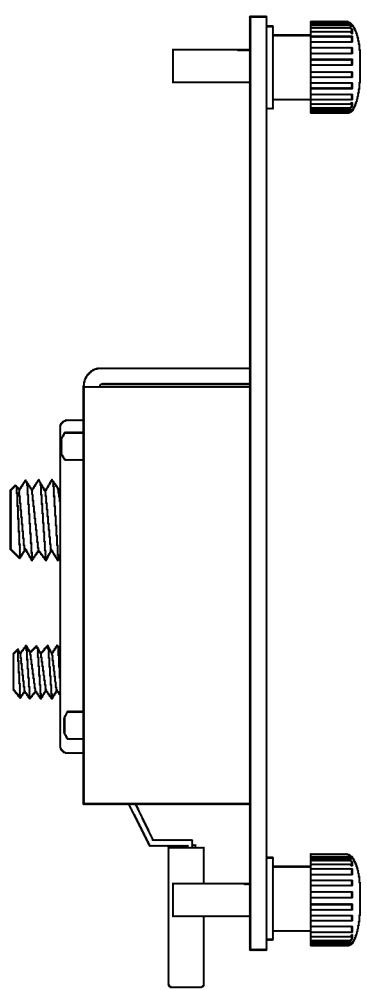
Figure 19:
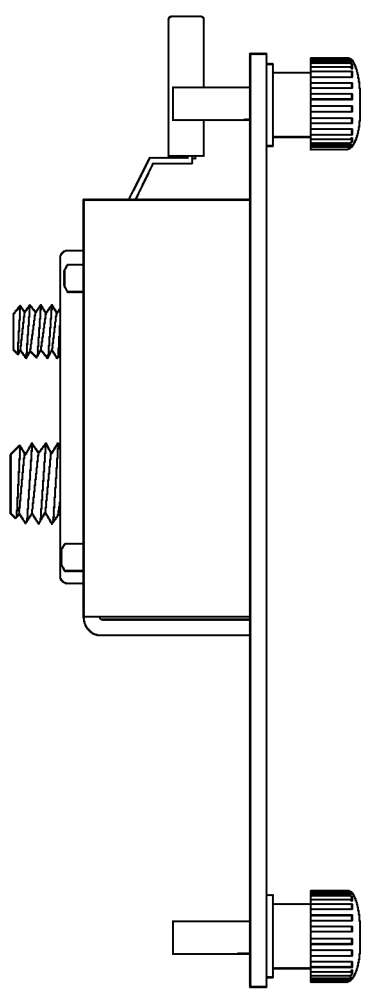
Figure 20:
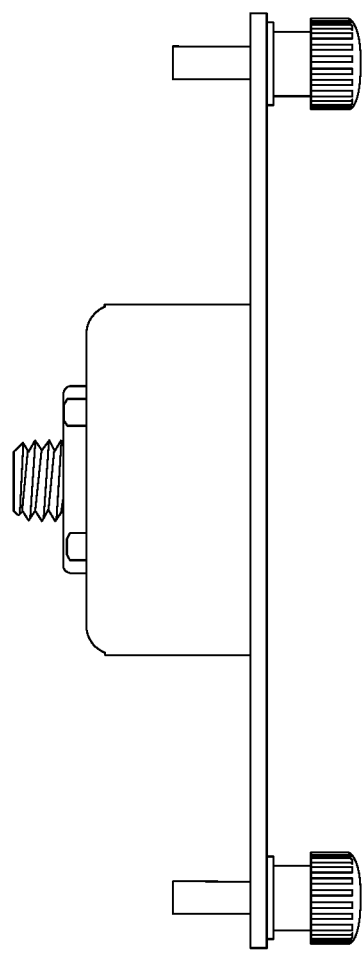
Figure 21:
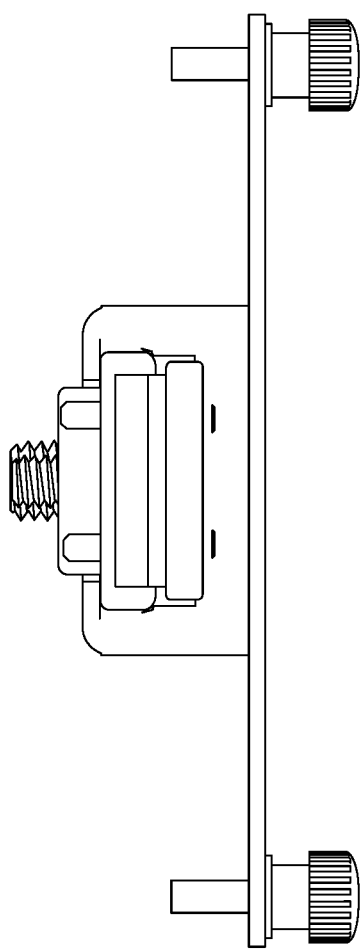

FIG. 15B is a view of the alternative configuration of FIG. 14 connected and in use. As illustrated in FIG. 15B, the example camera 402 is connected to the example mounting plate 502 via the example alternative mounting plate connector 1402, the example quick release plate 1416 and the example quick release base 1408.

FIGS. 16-21 are alternative views of the example modular mount 200.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that mount a camera to a mounting plate. Example methods, apparatus, systems, and articles of manufacture to mount a camera to a mounting plate are disclosed herein. Further examples and combinations thereof include the following: An apparatus for mounting a camera to a mounting plate, the apparatus comprising a camera socket connector to connect to a socket of the camera, and a mounting plate connector to connect to the mounting plate, wherein the camera socket connector able to be removably coupled to the mounting plate connector.

Example 2 includes the apparatus of example 1, wherein the mounting plate connector includes four attachment holes positioned with uniform spacing to align with corresponding holes in the mounting plate.

Example 3 includes the apparatus of example 1, wherein the socket of the camera is a tripod socket.

Example 4 includes the apparatus of example 1 wherein the mounting plate connector attaches to the camera socket connector by sliding, and locks in place.

Example 5 includes the apparatus of example 1, wherein the mounting plate connector includes a camera housing configured to receive the camera and the camera socket connector.

Example 6 includes the apparatus of example 2, wherein the mounting plate connector has four attachment holes arranged in a 75 millimeter by 75 millimeter square pattern.

Example 7 includes the apparatus of example 2, wherein the mounting plate connector has four attachment holes in a 100 millimeter by 100 millimeter square pattern.

Example 8 includes the apparatus of example 1, wherein the mounting plate connector and the mounting plate include two attachment holes spaced a first distance apart, and two attachment holes spaced a second distance apart, the first distance different than the second distance.

Example 9 includes the apparatus of example 1, wherein the camera socket connector includes a first screw hole and a second screw hole, the first screw hole to allow for attachment to a first camera, and the second screw hole to allow for attachment to a second camera.

Example 10 includes the apparatus of example 1, wherein the camera socket connector directly attaches to a camera, and the camera socket connector connects to a mounting plate through a tube that is flexible.

Example 11 includes the apparatus of example 10 wherein the tube is a straight rigid tube, and the camera socket connector is able to be positioned at different heights along the straight rigid tube.

Example 12 includes the apparatus of example 10, wherein the tube attaches to a mounting arm allowing a longitudinal and lateral distance.

Example 13 includes the apparatus of example 3, wherein the camera socket connector is positioned to allow a battery cover of the camera to be opened and closed.

Example 14 includes the apparatus of example 4, wherein the camera and camera socket connector slide into the camera housing through a quick release mechanism configured to allow attachment and release without a screw or other fastener.

Example 15 includes an apparatus for mounting a camera to a mounting plate, the apparatus comprising means for connecting to a mounting plate, and means for connecting to a quick release base, wherein the camera is able to be removably coupled to the quick release base via a quick release plate.

Example 16 includes an apparatus for mounting a camera to a mounting plate, the apparatus comprising a first attachment means attached to a camera, and a second attachment means attached to a mounting plate, wherein the first attachment means engages with the second attachment means to removably couple the camera with respect to the mounting plate.

Example 17 includes the apparatus of example 16, wherein the first attachment means attached to the camera is positioned to allow a battery cover to be opened and closed.

Example 18 includes the apparatus of example 16, wherein the first attachment means attached to the camera is fastened to the second attachment means by a quick release mechanism, without a screw or other fastener.

Example 19 includes the apparatus of example 16, wherein the second attachment means includes a dimensioning corresponding to the mounting plate.

Example 20 includes the apparatus of example 16, wherein the first attachment means slides into the second attachment means and locks in place.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for mounting a camera to a mounting plate, the apparatus comprising:
   a symmetrical camera socket connector to connect to a socket of the camera; and
   a mounting plate connector to connect to the mounting plate, the mounting plate connector including:
   a plate;
   a housing to receive the camera socket connector, the housing integrated with and protruding from the plate; and
   a quick release mechanism positioned in the housing, the quick release mechanism including a lever that, when pressed, bends to allow the camera socket connector to enter and exit the housing,
   wherein the camera socket connector is able to be removably coupled to the mounting plate connector via the housing and the quick release mechanism, the camera socket connector able be positioned within the housing in a plurality of orientations.

2. The apparatus of claim 1, wherein the mounting plate connector includes four attachment holes positioned with uniform spacing to align with corresponding holes in the mounting plate.

3. The apparatus of claim 2, wherein the mounting plate connector has four attachment holes arranged in a 75 millimeter by 75 millimeter square pattern.

4. The apparatus of claim 2, wherein the mounting plate connector has four attachment holes in a 100 millimeter by 100 millimeter square pattern.

5. The apparatus of claim 1, wherein the socket of the camera is a tripod socket.

6. The apparatus of claim 5, wherein the camera socket connector is positioned to allow a battery cover of the camera to be opened and closed.

7. The apparatus of claim 1, wherein the camera socket connector attaches to the mounting plate connector by sliding into the housing, and wherein the quick release mechanism is configured to lock the camera socket connector in place.

8. The apparatus of claim 7, wherein the camera socket connector releases from the mounting plate connector by sliding out of the housing when the quick release mechanism lever is pressed to unlock the camera socket connector.

9. The apparatus of claim 1, wherein the mounting plate connector and the mounting plate include two attachment holes spaced a first distance apart, and two attachment holes spaced a second distance apart, the first distance different than the second distance.

10. The apparatus of claim 1, wherein the camera socket connector includes a first screw hole and a second screw hole, the first screw hole to allow for attachment to a first camera, and the second screw hole to allow for attachment to a second camera.

11. The apparatus of claim 1, wherein a natural state of the quick release mechanism is a locked position to secure the camera socket connector in place.

12. The apparatus of claim 1, wherein the quick release mechanism is configured to allow attachment and release without a screw or other fastener, the quick release mechanism to secure the camera socket connector.

13. The apparatus of claim 1, wherein the camera socket connector supports a weight of the camera in a plurality of positions.

14. An apparatus for mounting a camera to a mounting plate, the apparatus comprising:
- a first attachment means attached to a camera, wherein the first attachment means are symmetric about an axis; and
- a second attachment means attached to a mounting plate, the second attachment means including:
  - housing means to receive the first attachment means; and
  - quick release means positioned in the housing means, the quick release means including bending means to secure the first attachment means to the second attachment means, wherein the first attachment means engages with the second attachment means to removably couple the camera with respect to the mounting plate via the housing means and the quick release means in a plurality of orientations.

15. An apparatus for mounting a camera to a mounting plate, the apparatus comprising:
- means for connecting to a mounting plate;
- means for receiving a symmetrical quick release plate that couples to the camera, the means for receiving the quick release plate integrated with the means for connecting to the mounting plate; and
- means for securing the quick release plate, the means for securing the quick release plate including bending means to allow for quick release of the quick release plate, wherein the camera is able to be removably coupled to the means for connecting to the mounting plate via the quick release plate and the bending means, the quick release plate able to be positioned within the means for receiving the quick release plate in a plurality of orientations.

16. The apparatus of claim 14, wherein a natural state of the quick release means is a locked position to secure the first attachment means in place.

17. The apparatus of claim 14, wherein the first attachment means attached to the camera is positioned to allow a battery cover to be opened and closed.

18. The apparatus of claim 14, wherein the first attachment means attached to the camera is secured to the second attachment means by the quick release means without a screw or other fastener.

19. The apparatus of claim 14, wherein the second attachment means includes a dimensioning corresponding to the mounting plate.

20. The apparatus of claim 14, wherein the first attachment means slides into the second attachment means via the housing means and locks in place via the quick release means.

* * * * *